(12) United States Patent
Mandelstam

(10) Patent No.: US 7,512,227 B2
(45) Date of Patent: Mar. 31, 2009

(54) ECHO CANCELLER CONTROLLER

(75) Inventor: David R. Mandelstam, Thornhill (CA)

(73) Assignee: Sangoma Technologies Corporation (CA)

( * ) Notice: Subject to any disclaimer, the term of this patent is extended or adjusted under 35 U.S.C. 154(b) by 220 days.

(21) Appl. No.: 11/423,357

(22) Filed: Jun. 9, 2006

(65) Prior Publication Data

US 2006/0280135 A1 Dec. 14, 2006

Related U.S. Application Data

(60) Provisional application No. 60/689,252, filed on Jun. 10, 2005.

(51) Int. Cl.
*H04M 9/08* (2006.01)

(52) U.S. Cl. .............................. 379/406.04

(58) Field of Classification Search ............ 379/406.04
See application file for complete search history.

(56) References Cited

U.S. PATENT DOCUMENTS

| | | | |
|---|---|---|---|
| 4,658,420 A | 4/1987 | Fukushi et al. | |
| 5,014,307 A | 5/1991 | Joffe et al. | |
| 5,123,009 A | 6/1992 | Winter | |
| 5,689,556 A | 11/1997 | Gupta et al. | |
| 5,815,568 A | 9/1998 | Trump | |
| 6,052,462 A | 4/2000 | Lu | |
| 6,563,803 B1 | 5/2003 | Lee | |
| 6,580,793 B1 | 6/2003 | Dunn et al. | |
| 6,947,549 B2 * | 9/2005 | Yiu et al. | 379/406.01 |
| 2003/0016815 A1 * | 1/2003 | Kurtz et al. | 379/406.01 |

FOREIGN PATENT DOCUMENTS

| | | |
|---|---|---|
| JP | 01-221027 A | 9/1989 |
| JP | 2000-252883 A | 9/2000 |
| JP | 2001-86225 A | 3/2001 |

OTHER PUBLICATIONS

Patent Abstracts of Japan for JP 2001-086225 A, published Mar. 30, 2003.
Patent Abstracts of Japan for 2000-252883 A, published Sep. 14, 2000.
Patent Abstracts of Japan for 01-221027 A, published Sep. 4, 1989.

* cited by examiner

*Primary Examiner*—Alexander Jamal
(74) *Attorney, Agent, or Firm*—Katten Muchin Rosenman LLP

(57) ABSTRACT

An apparatus and method for disabling an echo canceller in a communication channel is external to the echo canceller. The average power of the received signal is compared to the average power of the transmitted signal and if the received signal is more than 26 dB below the transmitted signal, then it is determined that echo cancellation is not required. If the received signal is less than 6 dB below the transmitted signal, then there is double talk present and a determination can not be made. The invention provides a low cost system for controlling echo cancellers and can continue to monitor echo during a call. The invention is well suited to implementation on a field programmable gate array (FPGA) or application specific integrated circuit (ASIC).

19 Claims, 2 Drawing Sheets

ECHO CANCELLER CONTROLLER

CROSS-REFERENCE TO RELATED APPLICATIONS

The entire subject matter of U.S. Provisional patent application Ser. No. 60/689,252 filed Jun. 10, 2005 and entitled ECHO CANCELLER CONTROLLER is hereby incorporated by reference.

The applicant claims priority benefit under Title 35, United States Code, Section 119(e) of U.S. Provisional patent application Ser. No. 60/689,252 filed Jun. 10, 2005 and entitled ECHO CANCELLER CONTROLLER.

TECHNICAL FIELD

The present invention relates to telecommunications systems and more particularly to control of echo cancellers in telecommunications systems.

BACKGROUND OF THE INVENTION

Electrical and acoustic echo is always present in telephony systems to some degree. Echo becomes a problem when the echo is both loud enough to be perceptible and the echo is delayed relative to the speech source. In the case of local and even most medium distance calls the lag between speech and reception of the echo is in the order of a few milliseconds, and the ear hears this as side tone, which is a normal part of speaking on a telephone handset. When there are appreciable delays, even quite low levels of echo are annoying, and may make speech impossible. Such delays traditionally were due to long transmission and storage paths inherent in intercontinental calls, particularly over satellite links.

Modern packet voice systems such as Voice over IP (VoIP) systems always introduce delays because of processing, packetizing and buffering of the voice signals. Systems that include standard telephony and packetized voice will generally have perceived echo problems unless the level of echo on the line is very low. Thus gateways between traditional telephony systems and packetized systems such as VoIP generally incorporate echo cancellers at the PSTN interface.

As technology has changed, use of echo cancellation in the telephone network at the near end has increased. What was originally used only for intercontinental trunks is now used routinely for all long distance calls exceeding 600 km. Cell phone calls are nearly always echo cancelled and many local calls are echo cancelled by the PSTN because the echo cancellation capacity is there. Calls that include no analog signal anywhere in the circuit such as calls from ISDN telephones or packetized voice calls do not have any electrical echo and therefore usually need no echo cancellation. In practice, therefore, a large fraction of the calls handled by a gateway system are already echo cancelled, and do not need additional echo cancellation.

Echo cancellers are generally special purpose hardware devices. Although the cost of the hardware required to handle every call has come down, it is still significant. It is also possible to perform echo cancellation in software on general purpose devices such as PCs, but echo cancellation consumes significant computing resources which are then not available for other purposes, so that the echo cancellation task limits the practical size of software-based telephony applications such as PBXs or IVRs.

Systems for disabling echo cancellers are known in the prior art. For example, U.S. Pat. No. 6,580,793 issued Jun. 17, 2003 to Dunn et al., discloses a method and apparatus for echo cancellation with self-deactivation. The apparatus of Dunn et al. uses an echo canceller based on an adaptive filter. The adaptive filter determines an estimate of an echo signal present in an untreated signal received from a "near" end of a communications channel and subtracts the estimated echo from the untreated received signal. The difference represents the energy in the estimated echo signal generated by the adaptive filter. If this energy is large, significant echo is present and the echo canceller remains activated. The echo cancellation disabler of Dunn et al. may have disadvantages such as requiring specialized echo cancellers and ties up echo cancellation resources to determine if echo cancellation is required.

Accordingly, a simple, low cost method and system for controlling echo cancellation so as to enable it when required or disable it when it is not required, remains highly desirable.

SUMMARY OF THE INVENTION

In one embodiment, the present invention comprises a simple method or apparatus, external to and separate from the echo canceller, that can sample the transmit (TX) and received (RX) voice signal and determine whether or not the received signal needs to be passed through an echo cancellation scheme or not. If no echo is present on the communications channel (or if the call is already echo cancelled), then the hardware or software resources that would otherwise be used for echo cancellation can be freed up for other uses. Thus, in some embodiments, the invention comprises a device or method separate from and upstream of the echo canceller, and measures the presence of echo and turns the downstream echo canceller on or off.

Accordingly, an aspect of the present invention provides a method for disabling a local echo canceller in a communications channel. The method is performed external to said echo canceller and the method comprises steps of: measuring a power level of a transmitted signal (TX); measuring a power level of a received signal (RX); detecting a presence of double talk in said received signal (RX); detecting a substantial absence of echo in said received signal (RX); determining that said local echo canceller is not required if no double talk is detected and if a substantial absence of echo is detected; and disabling said local echo canceller responsive to said determining that said local echo canceller is not required.

In some embodiments, the steps of measuring a power level comprise measuring a parameter representative of a power level.

In some embodiments the step of determining that said local echo canceller is not required is further responsive to a step of determining that the power level of said transmitted signal is above a predetermined minimum threshold.

In some embodiments, the predetermined minimum threshold is −20 dBm.

In some embodiments, the step of detecting a presence of doubletalk in said received signal (RX) comprises a step of determining that the power level of said received signal (RX) relative to the power level of said transmitted signal (TX) is sufficiently high such that doubletalk can reasonably be considered to be present.

In some embodiments, the step of detecting a substantial absence of echo in said received signal (RX) comprises a step of determining that the power level of said received signal (RX) relative to the power level of said transmitted signal (TX) is sufficiently low such that echo can reasonably be considered not to be present.

In some embodiments, the step of detecting a presence of double talk in said received signal (RX) comprises a step of determining that the amplitude of said transmitted signal (TX) is at most 2 times the amplitude of said received signal (RX).

In some embodiments, the step of detecting a presence of double talk in said received signal (RX) comprises a step of determining that the power level of said received signal (RX) is higher than the power level of said transmitted signal (TX) minus 6 dB.

In some embodiments, the step of detecting a substantial absence of echo in said received signal (RX) comprises a step of determining that the amplitude of said transmitted signal (TX) is at least 32 times the amplitude of said received signal (RX).

In some embodiments, the step of detecting a substantial absence of echo in said received signal (RX) comprises a step of determining that the power level of said received signal (RX) is lower than the power level of said transmitted signal (TX) minus 30 dB.

In some embodiments, the steps of measuring a power level, comprise computing a sum of the moduli of a predefined plurality of signal amplitude measurements of said transmitted signal (TX) and said received signal (RX) respectively.

In some embodiments, the predefined plurality of signal amplitude measurements is 64.

In some embodiments, the step of disabling said local echo canceller occurs only after a predefined plurality of occurrences of determining that said local echo canceller is not required.

In some embodiments, if double talk is detected, no determination is made of whether said local echo canceller is required or not.

In some embodiments, the step of disabling said local echo canceller, is preceded by a step of applying a smoothing function.

In some embodiments, the step of applying a smoothing function comprises tabulating a predefined plurality of successful determinations that said local echo canceller is not required over a predefined plurality of occurrences of determining steps.

In some embodiments, the predefined plurality of successful determinations that said local echo canceller is not required is greater than 89 of 100 occurrences of determining steps.

In some embodiments, the step of determining that said local echo canceller is not required occurs only after a predetermined hangover period after the last occurrence of double talk was detected.

In other embodiments, said transmitted signal and said received signal are Mu-Law encoded and the steps of measuring a power level further comprise linearizing the Mu-Law encoded signals.

In still other embodiments, said transmitted signal and said received signal are A-Law encoded and the steps of measuring a power level further comprise linearizing the A-Law encoded signals.

In some embodiments, said step of linearizing is performed using a look-up table.

Another aspect of the present invention provides an apparatus operable to perform the method steps listed above.

Another aspect of the present invention provides a computer-readable medium having computer-executable instructions for performing the steps recited in claim 1.

Still another aspect of the present invention provides a field programmable gate array (FPGA) programmed to perform the method steps listed above.

Still another aspect of the present invention provides an application specific integrated circuit (ASIC) operable to perform the method steps listed above.

Yet another aspect of the present invention provides an apparatus to control an echo canceller in a telecommunications channel. The apparatus comprises: TX measuring means for measuring a power level of a transmitted signal (TX); RX measuring means for measuring a power level of a received signal (RX); double talk detecting means for detecting a presence of double talk in said received signal (RX); absence of echo detecting means for detecting a substantial absence of echo in said received signal (RX); determining means for determining that said local echo canceller is not required if no double talk is detected and if a substantial absence of echo is detected; and disabling means for disabling said local echo canceller responsive to said determining that said local echo canceller is not required.

In some embodiments, apparatus is independent of the local echo canceller.

In some embodiments, apparatus is external to the local echo canceller.

In some embodiments, the measuring means for measuring a power level comprise means for measuring a parameter representative of a power level.

Some embodiments further comprise a TX presence determining means for determining that the power level of the transmitted signal is above a predetermined minimum threshold.

In some embodiments, said TX measuring means and said RX measuring means are operable to measure an average power level over a predetermined plurality of measurements.

In some embodiments, said TX measuring means and said RX measuring means are operable to compute a sum of a predefined plurality of power level measurements of said transmitted signal (TX) and said received signal (RX) respectively.

In some embodiments, said double talk detecting means is operable to determine that the power level of said received signal (RX) relative to the power level of said transmitted signal (TX) is sufficiently high such that doubletalk can reasonably be considered to be present.

In some embodiments, the substantial-absence of echo detecting means is operable to determine that the power level of said received signal (RX) relative to the power level of said transmitted signal (TX) is sufficiently low such that echo can reasonably be considered not to be present.

In some embodiments, said double talk detecting means is operable to determine that the amplitude of said transmitted signal (TX) is at most 2 times the amplitude of said received signal (RX).

In some embodiments, said double talk detecting means is operable to determine that the power level of said received signal (RX) is higher than the power level of said transmitted signal (TX) minus 6 dB.

In some embodiments, said absence of echo detecting means is operable to determine that the amplitude of said transmitted signal (TX) is at least 32 times the amplitude of said received signal (RX).

In some embodiments, said absence of echo detecting means is operable to determine that the power level of said received signal (RX) is lower than the power level of said transmitted signal (TX) minus 26 dB.

In some embodiments, said disabling means is operable to disable said local echo canceller only after a predefined plurality of occurrences of determining that said local echo canceller is not required.

Some embodiments are operable such that if double talk is detected, no determination is made of whether said local echo canceller is required or not.

In some embodiments, said determining means is operable to determine that said local echo canceller is not required, only after a predetermined hangover period after the last occurrence of double talk was detected.

In some embodiments, said determining means is operable to determine that said local echo canceller is required, if no double talk is detected and if a substantial absence of echo is not detected; and said disabling means is operable to enable said local echo canceller responsive to the determination that said local echo canceller is required.

In other embodiments, said TX measuring means and said RX measuring means are operable to measure Mu-Law encoded signals and linearize said TX signals and RX signals respectively.

In yet other embodiments, said TX measuring means and said RX measuring means are operable to measure A-Law encoded signals and linearize said TX signals and RX signals respectively.

In some embodiments, said TX measuring means and said RX measuring means comprise a look-up table for linearizing said TX and RX signals respectively.

In some embodiments, said apparatus is implemented in a field programmable gate array.

In some embodiments, said apparatus is implemented in an application specific integrated circuit (ASIC).

Another aspect of the present invention provides a method for improving a signal in telecommunications channel, the method comprising steps of: providing a plurality of telecommunications channels, providing one or more echo canceller functions, detecting in one of said plurality of telecommunications channels, a presence of echo, responsive to said detecting a presence of echo, enabling one of said one or more echo canceller functions on said one of said plurality of telecommunications channels.

In some embodiments, the step of detecting is performed independently of said one or more echo canceller functions.

In some embodiments, the step of detecting a presence of echo further comprises steps of: measuring a sample of a transmitted signal (TX) amplitude; measuring a sample of a received signal (RX) amplitude; and detecting an absence of double talk in said received signal (RX).

In some embodiments, the step detecting a presence of echo comprises a step of determining that the ratio TX/RX of sampled signals is sufficiently high such that echo can reasonably be considered not to be present.

In some embodiments, the step of detecting an absence of double talk comprises a step of determining that the ratio TX/RX of sampled signals is sufficiently low such that double talk can reasonably be considered to be present.

In some embodiments, the step of detecting a presence of echo further comprises a step of determining that the power represented by said sampled TX amplitude is above a predetermined minimum threshold.

In some embodiments, the predetermined minimum threshold is −20 dBm.

In some embodiments, the step of detecting a presence of echo comprises a step of determining that the ratio TX/RX of sampled signal amplitudes is less than 32.

In some embodiments, the step of detecting an absence of double talk comprises a step of determining that the ratio TX/RX of sampled signal amplitudes is less than 2.

In some embodiments, the step of detecting an absence of double talk, deems double talk to have been present in the previous sample of TX and RX signals, and subsequent sample of TX and RX signals if double talk is deemed to be present in the current sample of TX and RX signals.

In some embodiments, the step of determining a presence of echo further comprises a smoothing function.

In some embodiments, the smoothing function comprises steps of: measuring a presence of echo over a predefined number of samples; determining that echo is detected in at least a predetermined number of samples.

In some embodiments, the smoothing function comprises steps of: measuring a substantial absence of echo over a predefined number of samples; determining that echo is substantially absent in at most a predetermined number of samples.

In some embodiments, it is determined that the echo is substantially absent in less than 85 of 100 samples.

In some embodiments, the steps of measuring a sample of transmitted signal (TX) amplitude and measuring a sample of received signal (RX) amplitude each comprises steps of: measuring a companded signal amplitude; and linearizing said companded signal amplitude.

In some embodiments, the step of linearizing said companded signal amplitude comprises applying the modulus of said companded signal amplitude to a lookup table.

In some embodiments, the steps of measuring a sample of transmitted signal (TX) amplitude and received signal (RX) amplitude each comprises steps of: measuring a predefined plurality of signal amplitudes; averaging said plurality of signal amplitudes.

In some embodiments, the averaging step comprises summing said plurality of signal amplitudes.

In some embodiments, the predefined plurality is 64.

Yet another aspect of the present invention provides a method for controlling a local echo canceller in a communications channel. The method comprises steps of: measuring the power level of a transmitted signal (TX); measuring the power level of a received signal (RX); detecting a presence of double talk if the ratio of said power level of the transmitted signal to the power level of the of a received signal is below a first predetermined ratio; detecting a substantial absence of echo in said received signal if the ratio of said power level of the transmitted signal to the power level of the of a received signal is above a second predetermined ratio; determining if said local echo canceller is required, wherein: responsive to not detecting a presence of double talk and not detecting a substantial absence of echo determining that said local echo canceller is required; responsive to not detecting a presence of double talk and detecting a substantial absence of echo, determining that said local echo canceller is not required; or responsive to a presence of double talk, determining that a requirement for said local echo canceller is indeterminate; and disabling said local echo canceller responsive to determining that said local echo canceller is not required and enabling said local echo canceller responsive to determining that said local echo canceller is required.

In some embodiments the step of determining if said local echo canceller is required is preceded by a step of determining that the power level of said transmitted signal is above a predetermined minimum threshold.

In some embodiments the predetermined minimum threshold is −20 dBm.

In some embodiments the step of detecting a presence of double talk in said received signal comprises a step of determining that the power level of said received signal (RX) is higher than the power level of said transmitted signal (TX) minus 6 dB.

In some embodiments the step of detecting a substantial absence of echo in said received signal (RX) comprises a step of determining that the power level of said received signal (RX) is lower than the power level of said transmitted signal (TX) minus 30 dB.

In some embodiments the method is performed external to said local echo canceller.

In some embodiments the steps of measuring a signal power level, comprise a measuring an average over a predefined plurality of signal power level measurements of said transmitted signal and said received signal respectively.

In some embodiments the step of disabling or enabling said echo canceller is preceded by a step of applying a smoothing function.

In some embodiments the step of applying a smoothing function comprises tabulating a first predefined plurality of occurrences of non-indeterminate determining steps and disabling said local echo canceller if more than a second predefined plurality of said occurrences of non-indeterminate steps determined that said local echo canceller was not required or enabling local echo canceller if less than a second predefined plurality of said occurrences of non-indeterminate steps determined that said local echo canceller was not required.

In some embodiments the second predefined plurality is approximately 85 and said first predefined plurality is approximately 100.

In some embodiments the step of determining if said local echo canceller is required occurs only after a predetermined hangover period after the last occurrence of double talk was detected.

In some embodiments the transmitted signal and the received signal are Mu-Law encoded and the steps of measuring a power level further comprise linearizing the Mu-Law encoded signals.

In some embodiments the step of linearizing is performed using a look-up table.

In some embodiments the transmitted signal and the received signal are A-Law encoded and the steps of measuring a power level further comprise linearizing the A-Law encoded signals.

In some embodiments the step of linearizing is performed using a look-up table.

Another aspect of the present invention provides a method for controlling a local echo canceller in a communications channel, the method performed external to said echo canceller, the method comprising steps of: measuring a power level of a transmitted signal (TX); measuring a power level of a received signal (RX); detecting a presence of double talk in said received signal (RX); detecting a substantial absence of echo in said received signal (RX); determining that said local echo canceller is not required responsive to not detecting a presence of double talk and detecting a substantial absence of echo or that said local echo canceller is required responsive to not detecting a presence of double talk and not detecting a substantial absence of echo; and controlling said local echo canceller responsive to said determining step.

Another aspect of the present invention provides an apparatus to control an echo canceller in a telecommunications channel. The apparatus comprises: TX measuring means for measuring the power level of a transmitted signal (TX); RX measuring means for measuring the power level of a received signal (RX); double talk detecting means for detecting a presence of double talk if the ratio of said power level of the transmitted signal to the power level of the of a received signal is below a first predetermined ratio; substantial-absence of echo detecting means for detecting a substantial absence of echo if the ratio of said power level of the transmitted signal to the power level of the of a received signal is above a second predetermined ratio; determining means for determining if said local echo canceller is required, wherein: responsive to not detecting a presence of double talk and not detecting a substantial absence of echo determining that said local echo canceller is required; responsive to not detecting a presence of double talk and detecting a substantial absence of echo, determining that said local echo canceller is not required; or responsive to a presence of double talk, determining that a requirement for said local echo canceller is indeterminate; and controlling means for disabling said local echo canceller responsive to determining that said local echo canceller is not required and enabling said local echo canceller responsive to determining that said local echo canceller is required.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

Figure 1:
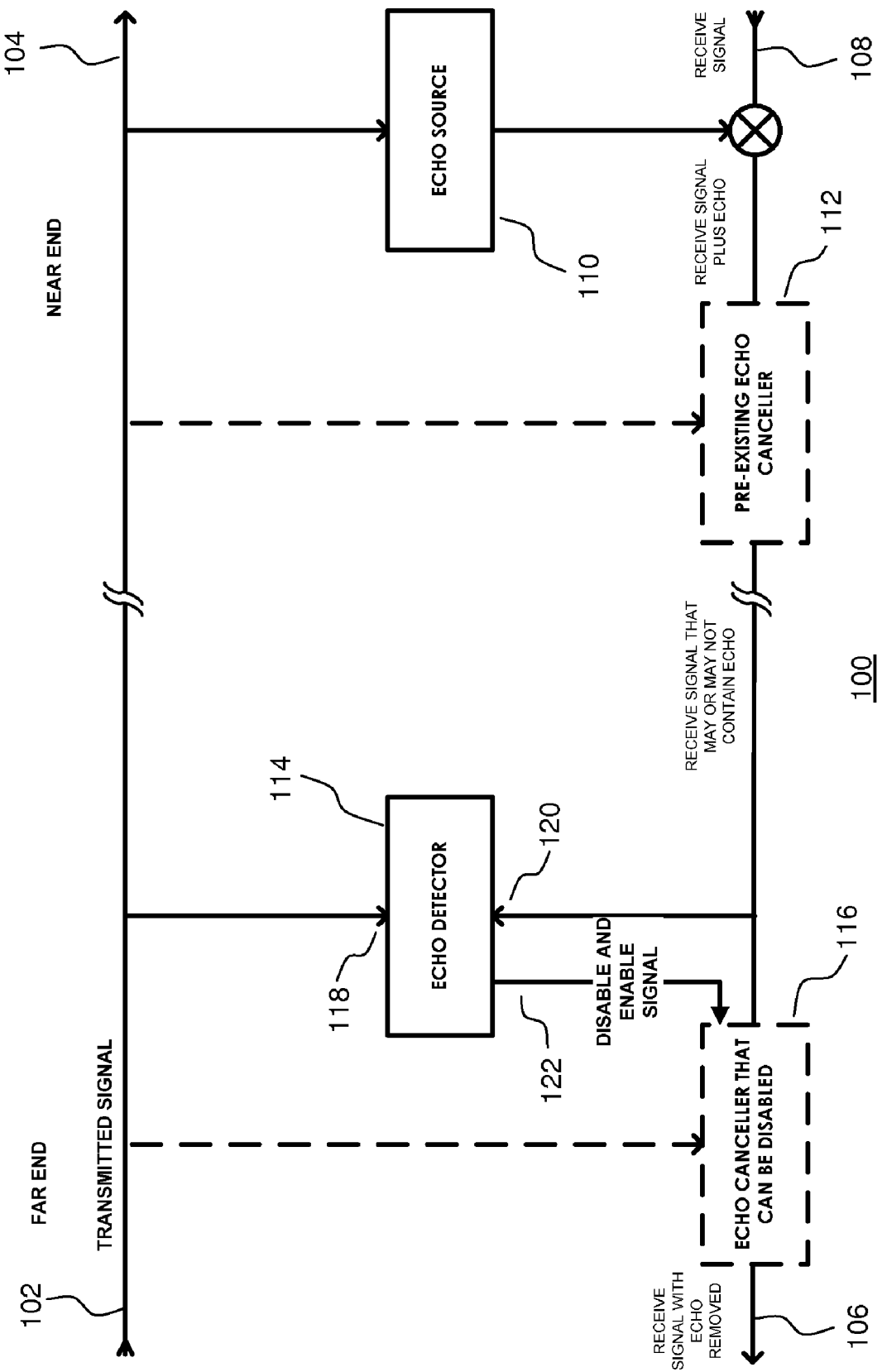
FIG. 1 is a schematic illustration showing an embodiment of the echo canceller controller of the present invention in a communications channel.

FIG. 1 illustrates a schematic showing an embodiment of the echo canceller controller 114 of the present invention in a communications channel 100. The communications channel 100 has an echo source 110 which introduces an echo of the transmitted signal 104 into a received signal 108. By convention, the terms "near end" and "far end" are relative to the echo source and refer to the proximity to the echo source 110, thus the "near end" of the transmitted signal 104 is closer to the echo source 110 than the "far end" transmitted signal 102, and likewise the "near end" of the received signal 108 is closer to the echo source 110 than the "far end" received signal 106. The echo introduced by echo source 110 may be large or small, and the communications channel 100 may or may not have a pre-existing echo canceller at the "near end". Thus, echo may or may not be present in the received signal. A local echo canceller 116 is available to provide echo cancellation if required. If the echo from the echo source 110 is substantial and the echo is not already cancelled by a "near end" echo canceller 112, then the local echo canceller 116 is required. On the other hand, if the echo in the received signal is very small, or if there is substantial echo from echo source 110 but the echo is already canceled by the "near end" echo canceller 112, then the local echo canceller 116 is not required and the resources of the local echo canceller 116 can be freed up. Echo canceller 116 can be implemented in hardware, in which case in can be switched out of the communication channel and made available to other communications channels. Echo canceller 116 could also be implemented in software in which case the valuable resource that can be freed up is CPU computing cycles, which could then be made available to support other channels. This can be significant if a software based communications switch has many channels.

The echo canceller controller 114 (labeled "echo detector" in FIG. 1) is separate and upstream from the local echo canceller 116. The echo canceller controller 114 is independent of the echo canceller 116 and can therefore determine if the echo canceller 116 is required before having to allocate the echo canceller 116 to the communications channel 100. The echo canceller controller is lower cost than the echo canceller 116, and can therefore remain in the communications channel. This also provides the advantage of being able to continuously monitor the need for echo cancellation during a call without tying up echo cancellation resources in the process.

The echo canceller controller 114 monitors the transmitted signal (TX) at 118 and monitors the received signal (RX) at 120. When the echo canceller controller 114 determines that echo canceller 116 is not required, it sends a disable signal on control line 122 to the echo canceller 116 to disable it. Likewise if the echo canceller controller 114 determines that echo cancellation is required, it sends an enable signal on control line 122.

The echo canceller controller 114 uses a simple and easy to implement technique to detect echo and determine if echo cancellation is required and is based on the following observations:

Echoes measured in the received signal are always less than half the amplitude of the transmitted signal. Therefore, if the measured power of the RX signal is greater than the measured power of the TX signal–6 dB (or equivalently, using linear units, TX/RX amplitude is less than 2), then the RX signal contains doubletalk (both sides talking at the same time) and it is not possible to determine if echo is present or not.

An echo canceller will generally attenuate echo by at least 26 dB and more typically by about 30 dB. Therefore, if the measured power of the RX signal is less than the measured power of the TX signal–30 dB (or equivalently, using linear units, the signal amplitude ratio TX/RX is greater than 32), then either the level of echo is negligible or echo cancellation is already present on the line. In either case, the local echo canceller is not required.

It is also useful to determine if the TX signal is above a minimum threshold, because if there is no measurable TX signal then comparing it to an even smaller level of RX signal will not be very meaningful. A useful minimum TX threshold can be around –20 dBm.

The echo detection techniques of the echo canceller controller 114 are simple, such that is easy to implement the echo canceller controller 114 in an apparatus such as a field programmable gate array (FPGA) or an application specific integrated circuit (ASIC), or in a computer-readable medium having computer-executable instructions for performing the described functions.

Figure 2:
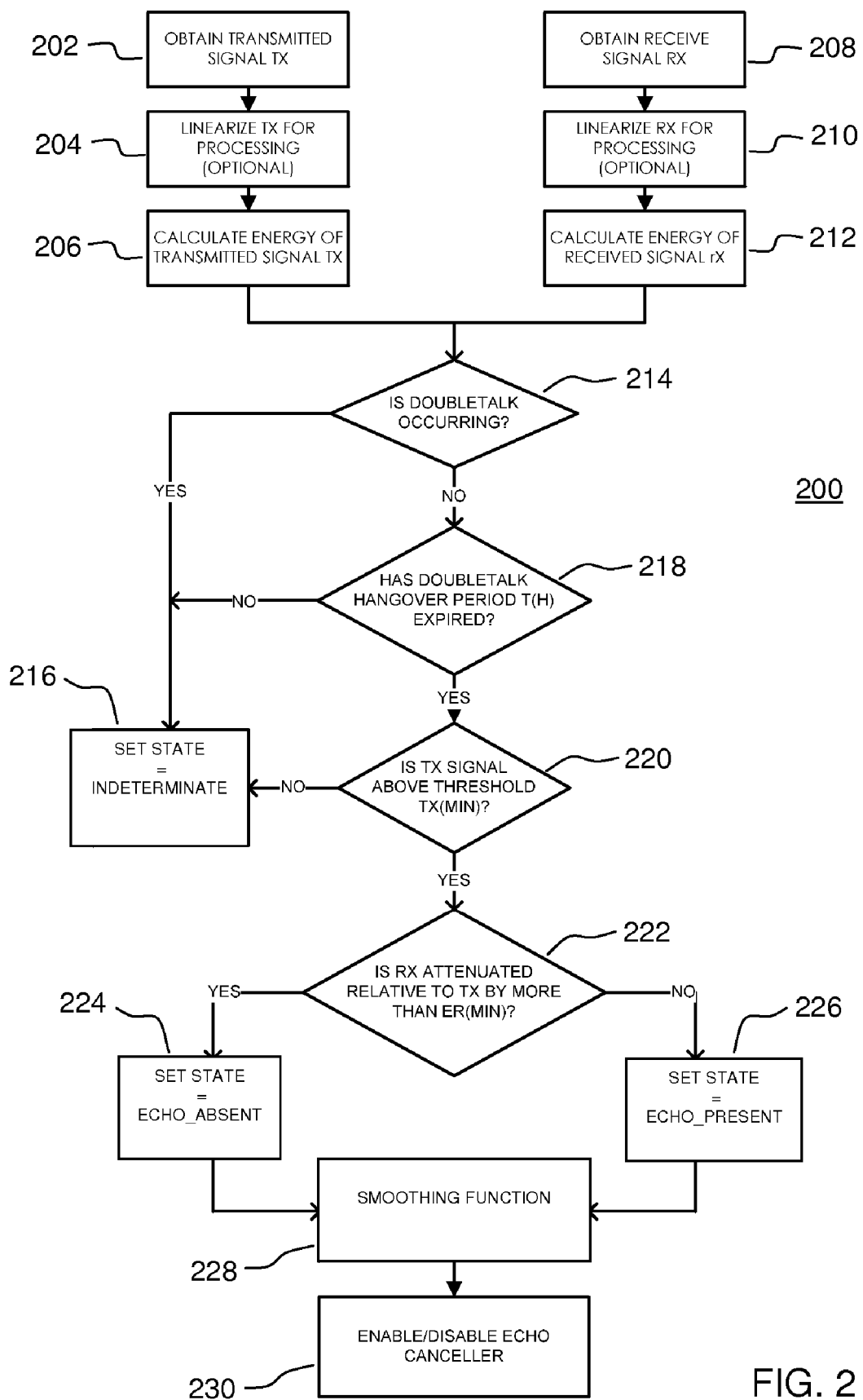
FIG. 2 is a flowchart illustration of an embodiment of the method of the present invention.

The operation of the echo canceller controller 114 will now be described in greater detail with reference to the flowchart of FIG. 2. As shown in FIG. 2, at step 202 the transmitted (TX) signal (from 118) is sampled (this is performed continuously every 0.125 mS). In a preferred embodiment described in FIG. 2, TX and RX are measured as digital representations of signal level (or amplitude) representative of the respective power levels (The signal levels are proportional to the square-root of the power levels). Other parameters representative of signal power levels could be measured as well, including measuring the power levels directly.

Digital communications signals are typically compressed using Mu-Law or A-Law companding. These signals may optionally (but preferably) be converted to linear signals for ease of calculation, thus at step 204, the TX signal is linearized using a 128 entry Mu-Law or A-Law look-up table as appropriate (country dependent). Only 128 entries are required because the polarity of the signal is not important, and the lookup is performed using the 7 bit modulus of the signal. Thus only the moduli of the signals are of interest.

The TX value is "averaged" over a number of samples at step 206 by summing 64 consecutive linearized TX values into a 32 bit TX sum ("averaged sample"). Thus the "averaged sample" is simply the sum of 64 consecutive TX sample values (or "taps"). Once this average is calculated, subsequent TX samples are summed into a new "averaged sample". In this embodiment, the number of samples to average (N) is 64. Other values of N could be used as well, that would be suitable to smooth over any sporadic signals and other anomalies. Similarly, and contemporaneously, at step 208, the received signal (from 120) is sampled (this is performed continuously every 0.125 mS) and linearized at step 210 and "averaged" at step 212. The averaged TX and RX values can then be used by decision steps 214, 218, 220. The order of these decision steps is not important. The echo canceller controller assigns one of three states for each averaged sample: ECHO_PRESENT, ECHO_ABSENT, and INDETERMINATE.

In general, TX and RX then pass through a doubletalk detector. Doubletalk detectors are well known prior art devices that are used in echo cancellers to enable or disable the adjustment of the echo cancellation parameters. If doubletalk is detected then no decision can be made about the presence of echo, because any echo that might be present would be overpowered by the double talk.

In the embodiment of FIG. 2, at step 214, a simple double talk detector is implemented as follows: TX signal level is divided by RX signal level and if the result is less than 2, (RX signal level is more than ½ the value of TX signal level) it is indicative of doubletalk present in the RX signal. These calculations are equivalent to determining that RX power is greater than TX power–6 dB. This level is generally accepted in the industry as being an indication of doubletalk, although slightly higher or lower values could also be used. Thus if double talk is detected, the process continues to step 216 where the state of the averaged sample is set to INDETERMINATE and no decision is made about the status of the echo canceller. From step 216, the process recommences steps 202 and 208.

Because doubletalk will in general begin and end partway through a sample, once doubletalk is detected at step 214, the previous averaged sample should be treated as if it included doubletalk and also be set to INDETERMINATE. Likewise, if at step 214, after doubletalk has apparently ceased, the process continues to step 218. A hangover period of one or more samples should be treated as if doubletalk is present. Thus, at the first instance when double talk is not detected, the process continues to step 216 and the state is set to INDETERMINATE to ensure no vestiges of double talk affect the determination of the presence or absence of echo.

If at step 218, no double talk was detected and the hangover period has expired, the process the process continues to step 220, where TX is compared to a minimum TX threshold ($TX_{min}$). In a preferred embodiment, $TX_{min}$ is set at –20 dBm. If TX is less than $TX_{min}$ then the measurements are not very meaningful and no determination of requirement for echo cancellation can be made and the process continues to step 216 and the state of the averaged sample is set to INDETERMINATE. If on the other hand, TX is above the $TX_{min}$ threshold, then the measurements are relevant and the process can continue to step 222.

At step 222, TX is divided by RX and if the result is greater than 32 (signal level RX is 32 times smaller than signal level TX) it means that there is no substantial echo present (either echo has already been attenuated by an upstream echo canceller or no substantial echo existed), and process continues to step 224, where the state of the averaged sample is set to ECHO_ABSENT. These calculations are equivalent to determining that RX power is attenuated relative to TX power by more than 30 dB). 30 dB attenuation of echo is generally considered in the industry to be a minimum acceptable level. Other threshold levels to determine an acceptable level of echo to tolerate could also be used. The decision to disable the local echo canceller (114) could be made at this point, and the process could jump to step 230 and disable the echo canceller. Preferably, however the decision to disable the echo canceller is deferred to incorporate a smoothing function at step 228.

At step 222, if the signal level ratio TX/RX is less than 32 then the process continues to step 226 where the state of the averaged sample is set to ECHO_PRESENT. The decision to enable the local echo canceller (114) could be made at this point, and the process could jump to step 230 and enable the echo canceller. The decision to enable the echo canceller is preferably deferred to the smoothing function at step 228.

The smoothing function at step 228 compensates for glitches such as anomalies in the communications signals, spurious noise signals, measurement errors or other activity on the communications channel. The smoothing function at step 228 processes the states as follows: The states of 100 consecutive averaged samples are tabulated (i.e. a decision time of about 1.25 seconds). INDETERMINATE samples are ignored. ECHO_ABSENT samples are counted. If at least 85 of 100 samples have the state ECHO_ABSENT, then it is determined that no substantial echo is present and the echo canceller is not required and at step 230 the echo canceller is disabled.

If less than 85 of 100 samples have the state ECHO_ABSENT, then the communications channel is determined to have substantial echo and the echo canceller is required, and at step 230, the echo canceller is enabled.

Other smoothing or averaging functions can be implemented at step 228 to compensate for glitches or spurious noise signals.

In the described embodiment, the echo canceller controller is enabled on a communications channel when a call is initiated. By default, the echo canceller controlled by the echo canceller controller is enabled. If the echo canceller controller determines that echo cancellation is not required, the echo canceller is disabled. Thus, the echo canceller is only assigned to the communications channel for the short duration required to determine that echo cancellation is not required, the echo canceller can subsequently be assigned to other communications channels as required.

In another embodiment, the echo canceller is disabled by default and only enabled when the echo canceller controller determines that echo cancellation is required. Such an embodiment would use slightly less echo canceller resources but at the expense of some possible echo during the first several seconds of a call.

As described above, the averaging period for smoothing function is 100 averaged samples (or approximately 1.25 seconds). This period can be dynamic and vary during a call on the communication channel. For example, at the start of a call the smoothing function at 228 may operate on a shorter interval (or a smaller number of samples) to be responsive to the need for echo cancellation and determine the echo cancellation state of the call. Subsequently, say after about 5 seconds, the smoothing interval may increase, because generally once a call is free of echo it tends to remain that way for long periods, if not for the duration of the call.

In the above described embodiments, the echo canceller controller is independent of the echo canceller. The echo canceller controller of the present invention does not require the use of an echo canceller to determine if substantial echo is present but it is understood that this independent functionality could nevertheless be incorporated within an echo canceller.

The embodiment(s) of the invention described above is (are) intended to be exemplary only. The scope of the invention is therefore intended to be limited solely by the scope of the appended claims.

I claim:

1. A method for controlling an echo canceller controller which controls a separate local echo canceller in a communications channel during a communication, with the echo canceller controller:
   measuring the power level of a transmitted signal (TX);
   measuring the power level of a received signal (RX);
   detecting a presence of double talk if the ratio of said power level of the transmitted signal to the power level of the of the received signal is below a first predetermined ratio;
   detecting a substantial absence of echo in said received signal if the ratio of said power level of the transmitted signal to the power level of the received signal is above a second predetermined ratio;
   determining if said local echo canceller is required, wherein:
      responsive to (i) not detecting a presence of double talk and (ii) not detecting a substantial absence of echo, determining that said local echo canceller is required;
      responsive to (i) not detecting a presence of double talk and (ii) detecting a substantial absence of echo, determining that said local echo canceller is not required; or
      responsive to a presence of double talk, determining that a requirement for said local echo canceller is indeterminate; and
   disabling said local echo canceller for the duration of the communication, responsive to determining that said local echo canceller is not required, and enabling said local echo canceller for the duration of the communication, responsive to determining that said local echo canceller is required.

2. A method as claimed in claim 1, wherein said step of determining if said local echo canceller is required is preceded by a step of determining that the power level of said transmitted signal is above a predetermined minimum threshold.

3. A method as claimed in claim 2, wherein said predetermined minimum threshold is substantially −20 dBm.

4. A method as claimed in claim 1, wherein the step of detecting a presence of double talk in said received signal comprises a step of determining that the power level of said received signal (RX) is higher than the power level of said transmitted signal (TX) minus substantially 6 dB.

5. A method as claimed in claim 1, wherein the step of detecting a substantial absence of echo in said received signal (RX) comprises a step of determining that the power level of said received signal (RX) is lower than the power level of said transmitted signal (TX) minus substantially 30 dB.

6. A method as claimed in claim 1, wherein said method is performed external to said local echo canceller.

7. A method as claimed in claim 1, wherein the steps of measuring the power level, comprise measuring an average power level over a predefined plurality of signal power level measurements of said transmitted signal and said received signal, respectively.

8. A method as claimed in claim 7, wherein the step of disabling or enabling said echo canceller is preceded by a step of applying a smoothing function.

9. A method as claimed in claim 8, wherein the step of applying a smoothing function comprises (i) tabulating a first predefined plurality of occurrences of non-indeterminate determining steps and (ii) disabling said local echo canceller if more than a second predefined plurality of said occurrences of non-indeterminate steps determined that said local echo canceller was not required, or enabling local echo canceller if less than a second predefined plurality of said occurrences of non-indeterminate steps determined that said local echo canceller was not required.

10. A method as claimed in claim 8, wherein the second predefined plurality is substantially 85 and said first predefined plurality is substantially 100.

11. A method as claimed in claim 1, wherein the step of determining if said local echo canceller is required occurs only after a predetermined hangover period after the last occurrence of double talk was detected.

12. A method as claimed in claim 1, wherein said transmitted signal and said received signal are Mu-Law encoded, and wherein the steps of measuring a power level further comprise linearizing the Mu-Law encoded signals.

13. A method as claimed in claim 12, wherein said step of linearizing is performed using a lookup table.

14. A method as claimed in claim 1, wherein said transmitted signal and said received signal are A-Law encoded, and wherein the steps of measuring a power level further comprise linearizing the A-Law encoded signals.

15. A method as claimed in claim 14, wherein said step of linearizing is performed using a look-up table.

16. A computer-readable medium having computer-executable instructions for causing one or more computers to control a local echo canceller in a communications channel during a communication, so that a separate echo canceller controller:

measures the power level of a transmitted signal (TX);

measures the power level of a received signal (RX);

detects a presence of double talk if the ratio of said power level of the transmitted signal to the power level of the of the received signal is below a first predetermined ratio;

detects a substantial absence of echo in said received signal if the ratio of said power level of the transmitted signal to the power level of the received signal is above a second predetermined ratio;

determines if said local echo canceller is required, wherein:

responsive to (i) not detecting a presence of double talk and (ii) not detecting a substantial absence of echo, determines that said local echo canceller is required;

responsive to (i) not detecting a presence of double talk and (ii) detecting a substantial absence of echo, determines that said local echo canceller is not required; or responsive to a presence of double talk, determines that a requirement for said local echo canceller is indeterminate; and disables said local echo canceller for the duration of the communication, responsive to determining that said local echo canceller is not required, and enabling said local echo canceller for the duration of the communication, responsive to determining that said local echo canceller is required.

17. An echo canceller controller, separate from the echo canceller, to control the echo canceller during a communication in a telecommunications channel, the apparatus comprising:

TX measuring structure configured to measure the power level of a transmitted signal (TX);

RX measuring structure configured to measure the power level of a received signal (RX);

double talk detecting structure configured to detect a presence of double talk if the ratio of said power level of the transmitted signal to the power level of the of the received signal is below a first predetermined ratio;

substantial-absence of echo detecting structure configured to detect a substantial absence of echo if the ratio of said power level of the transmitted signal to the power level of the received signal is above a second predetermined ratio;

determining structure configured to determine if said local echo canceller is required, wherein:

responsive to (i) not detecting a presence of double talk and (ii) not detecting a substantial absence of echo, determining that said local echo canceller is required;

responsive to (i) not detecting a presence of double talk and (ii) detecting a substantial absence of echo, determining that said local echo canceller is not required; or responsive to a presence of double talk, determining that a requirement for said local echo canceller is indeterminate; and controlling structure configured to (i) disable said local echo canceller for the duration of the communication, responsive to determining that said local echo canceller is not required, and (ii) enabling said local echo canceller for the duration of the communication, responsive to determining that said local echo canceller is required.

18. An echo canceller controller according to claim 17, comprising a field programmable gate array (FPGA).

19. An echo canceller controller according to claim 17, comprising an application specific integrated circuit (ASIC).

* * * * *